(12) United States Patent
Lynch et al.

(10) Patent No.: US 12,429,358 B2
(45) Date of Patent: Sep. 30, 2025

(54) SYSTEMS AND METHODS FOR EFFICIENT GRID-ESTIMATION OF SPHERICAL GEO-PROBABILITY FUNCTION

(71) Applicant: Cisco Technology, Inc., San Jose, CA (US)

(72) Inventors: Rebecca Ann Lynch, Denver, CO (US); Michael Thaddeus Moran, Brooklyn, NY (US); Richard Edward Harang, Alexandria, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 271 days.

(21) Appl. No.: 18/049,109

(22) Filed: Oct. 24, 2022

(65) Prior Publication Data
US 2024/0003709 A1    Jan. 4, 2024

Related U.S. Application Data (60) Provisional application No. 63/357,990, filed on Jul. 1, 2022.

(51) Int. Cl.
*G06F 16/00* (2019.01)
*G01C 21/00* (2006.01)
(52) U.S. Cl.
CPC ....... *G01C 21/387* (2020.08); *G01C 21/3859* (2020.08); *G01C 21/3893* (2020.08)
(58) Field of Classification Search
CPC .............. G01C 21/3859; G01C 21/387; G01C 21/3893
See application file for complete search history.

(56) References Cited

U.S. PATENT DOCUMENTS 9,183,438 B1 * 11/2015 Dhein ..................... G06F 16/29
9,500,444 B2 * 11/2016 Sammut ................... F41G 3/02
(Continued)

FOREIGN PATENT DOCUMENTS

CN     101795162 B  *  9/2013
CN     107798187 A  *  3/2018  ............. G06F 30/15
(Continued)

OTHER PUBLICATIONS

Contingent Kernel Density Estimation; Feb. 2012 PLoS One 7(2):e30549; DOI:10.1371/journal.pone.0030549; SourcePubMed; LicenseCC by 4.0; Authors: Scott Fortmann-Roe, Richard Starfield, Wayne Getz University of California, Berkeley; 11 pages; https://www.researchgate.net/publication/221882566_Contingent_Kernel_Density_Estimation.

*Primary Examiner* — Jean M Corrielus
(74) *Attorney, Agent, or Firm* — Baker Botts L.L.P.

(57) ABSTRACT

A system of one embodiment provides for efficient grid-estimation of spherical geo-probability function. The system includes a memory and a processor. The system accesses data, wherein the data includes training points and each training point includes a latitude value and a longitude value. The system also generates one or more grid points around each training point in the data. The system calculates a probability value for each grid point in the plurality of grid points using a probability density function. The system also combines each grid point into a geo-grid. The systems stores the geo-grid. In some embodiments, the system combines each grid point into a geo-grid by adding a probability value of a first grid point to a probability value of second grid point.

20 Claims, 5 Drawing Sheets

(56) References Cited

U.S. PATENT DOCUMENTS

| | | | |
|---|---|---|---|
| 10,254,082 B2 * | 4/2019 | Sammut | F41G 3/12 |
| 10,444,269 B2 * | 10/2019 | Sotak | H04B 17/318 |
| 10,458,753 B2 * | 10/2019 | Sammut | F41G 3/02 |
| 10,895,434 B2 * | 1/2021 | Sammut | F41G 5/06 |
| 11,255,640 B2 * | 2/2022 | Sammut | F41G 3/12 |
| 11,656,060 B2 * | 5/2023 | Sammut | F41G 3/06 235/404 |
| 2004/0133927 A1 * | 7/2004 | Sternberg | G06F 16/7847 375/240 |
| 2008/0186234 A1 * | 8/2008 | Alles | H04W 4/02 342/451 |
| 2008/0188239 A1 * | 8/2008 | Carlson | G01S 5/021 455/456.1 |
| 2009/0132568 A1 | 5/2009 | Syeda-Mahmood et al. | |
| 2012/0066104 A1 * | 3/2012 | Thalken | G06Q 40/06 705/35 |
| 2012/0257818 A1 | 10/2012 | Bertozzi et al. | |
| 2015/0160035 A1 * | 6/2015 | Longo | H04W 4/029 701/519 |
| 2015/0269225 A1 * | 9/2015 | Agrawal | G16C 20/90 707/769 |
| 2015/0309962 A1 | 10/2015 | Lichman et al. | |
| 2015/0362288 A1 * | 12/2015 | Sammut | F41G 1/38 235/404 |
| 2016/0026860 A1 * | 1/2016 | Dhein | G06V 30/422 382/113 |
| 2017/0205197 A1 * | 7/2017 | Sammut | F41G 3/08 |
| 2018/0120061 A1 * | 5/2018 | Sammut | F41G 1/38 |
| 2018/0340965 A1 * | 11/2018 | Sotak | H04B 17/318 |
| 2019/0037344 A1 * | 1/2019 | Vangipuram | H04B 17/27 |
| 2019/0200318 A1 * | 6/2019 | Wirola | G01S 5/0242 |
| 2019/0257619 A1 * | 8/2019 | Sammut | F41G 3/12 |
| 2020/0037102 A1 * | 1/2020 | Zhang | G06F 16/2246 |
| 2020/0064103 A1 * | 2/2020 | Sammut | F41G 3/08 |
| 2020/0208992 A1 | 7/2020 | Fowe | |
| 2021/0123706 A1 * | 4/2021 | Sammut | F41G 3/08 |
| 2022/0163290 A1 * | 5/2022 | Sammut | F41G 3/08 |
| 2024/0003709 A1 * | 1/2024 | Lynch | G01C 21/387 |

FOREIGN PATENT DOCUMENTS

| | | | | |
|---|---|---|---|---|
| CN | 107679476 B | * | 10/2020 | G06K 9/0053 |
| CN | 111898903 A | * | 11/2020 | |
| CN | 114415231 A | * | 4/2022 | G01V 1/288 |

* cited by examiner

SYSTEMS AND METHODS FOR EFFICIENT GRID-ESTIMATION OF SPHERICAL GEO-PROBABILITY FUNCTION

RELATED APPLICATIONS

This application claims priority to U.S. Provisional Application No. 63/357,990, filed Jul. 1, 2022, which is hereby incorporated by reference in its entirety.

TECHNICAL FIELD

The present disclosure relates generally to communication networks, and more specifically, to systems and methods for efficient grid-estimation of spherical geo-probability function.

BACKGROUND

Application security is of utmost importance in today's connected world. Client devices (such as smart phones, laptops, and cars) can generate location data through GPS, IP address, or triangulation. As more client devices become connected to the Internet, the amount of location data generated by these devices can be immense. A probability density function (PDF) is a function whose value at any given sample in the sample space can be interpreted as providing a relative likelihood that the value of the random variable would be close to that sample. A kernel density estimator (KDE) is a method of estimating a true PDF of a population of data. When that population scales to billions of samples, however, the time and memory involved to train the necessary function and store its subsequent artifacts grows to exceed a level of practicality.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

According to one embodiment of the present disclosure, a system for efficient grid-estimation of spherical geo-probability function is provided. The system includes a memory and a processor. The system accesses data, wherein the data includes training points and each training point includes a latitude value and longitude value. The system also generates one or more grid points around each training point in the data. The system calculates a probability value for each grid point in the plurality of grid points using a probability density function. The system also combines each grid point into a geo-grid. The system stores the geo-grid. In some embodiments, the system combines each grid point into a geo-grid by adding a probability value of a first grid point to a probability value of second grid point. In some embodiments, a latitude value of the first grid point is equal to a latitude value of the second grid point. In some embodiments, the system further filters the grid points that have a probability of zero. In some embodiments, the probability density function is based on the von Mises-Fisher distribution.

According to one embodiment of the present disclosure, a method for efficient grid-estimation of spherical geo-probability function is provided. The method accesses data, and the data includes training points and each training point includes a latitude value and longitude value. The method also generates one or more grid points around each training point in the data. The method calculates a probability value for each grid point in the plurality of grid points using a probability density function. The method also combines each grid point into a geo-grid. The method stores the geo-grid. In some embodiments, the method combines each grid point into a geo-grid by adding a probability value of a first grid point to a probability value of second grid point. In some embodiments, a latitude value of the first grid point is equal to a latitude value of the second grid point. In some embodiments, the method further filters the grid points that have a probability of zero. In some embodiments, the probability density function is based on the von Mises-Fisher distribution. In some embodiments, the method further presents a graphical user-interface that includes one or more dots overlayed on where each dot corresponds to a grid point in the geo-grid.

Certain embodiments of the disclosure may provide one or more technical advantages. A technical advantage of one embodiment may include allowing for the efficient generation of a grid representation of the approximate probability density function for a customer's authentication data. Another advantage of one embodiment is that, for each new authentication that a system receives, the system can immediately triage the risk of the new authentication because of the efficiency of one or more of the present embodiments. Another advantage that the present disclosure discloses is a memory and time efficient representation of a probability density function (PDF). For example, in one embodiment where a PDF that is a representation of billions of data points, the memory cost would be fixed. In some embodiments, the maximum memory cost would be (180*4)* (360*4) because in this embodiment it would be the (180*360) for possible latitudes and longitudes, further multiplied by (4*4) for 0.25 increments between grid points. In some embodiments, this allows for a fixed time to retrieve a probability value for a grid point because it is a single database lookup. One or more other technical advantages may be readily apparent to one skilled in the art from the figures, descriptions, and claims included herein.

Example Embodiments

This disclosure describes systems and methods for efficient grid-estimation of spherical geo-probability function. A kernel density estimator (KDE) is a method of estimating a true probability density function (PDF) of a population of data. In the past, when that population scales to billions of samples, however, the time and memory involved to train the necessary function and store its subsequent artifacts grows to exceed a level of practicality. The present disclosure abstracts both the calculation of the PDF and the storage of the PDF artifacts themselves such that a probability for a new sample can be immediately and efficiently retrieved.

In certain embodiments, training data includes data points that include a latitude value and a longitude value. A KDE is generated for each point in the training data. In some embodiments, a grid is generated for each data point in the training data. The grid includes a fixed set of grid points. The fixed set of grid points may be defined by the latitude and longitude values. In some embodiments, a PDF (such as the Von-Mises Fisher probability density function) estimates the probability value for the fixed set of grid points around each data point in the training data. In some embodiments, the method includes generating a grid representation of the approximate probability density function for a customer's authentication data, and the grid representation is used to query the approximate likelihoods of new samples of data and assess risk on a contextual basis relative to prior probabilities for a given subject. For example, in some embodiments, if there are N training points, the method generates N independent grids of X by Y grid points. In some embodiments, the grid is a 50×50 set of grid points in which each grid point is 0.25 latitude and longitude away from its respective neighbor(s). In some embodiments, the N-th training point is the center of the N-th grid. Since a KDE exists as a summation of PDFs, the method sums each of the independent grids. The result in some embodiments is a sparse matrix over the fixed space (in this case, the finite number of latitude and longitude values on the globe).

Figure 1:
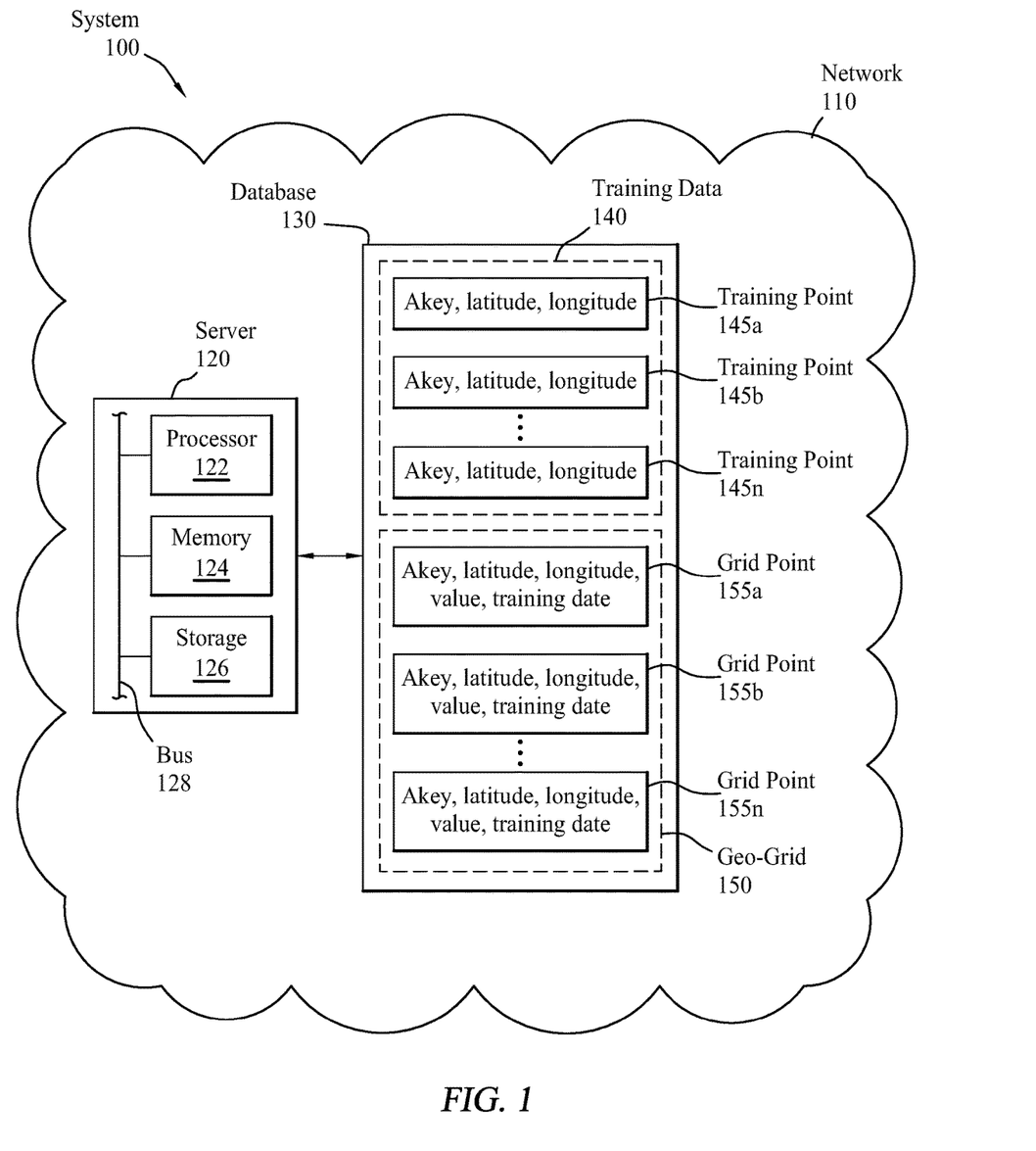
FIG. 1 illustrates an example system for efficient grid-estimation of spherical geo-probability function, according to particular embodiments.

Thus, one advantage of particular embodiments is to generate a grid representation of the approximate probability density function for a customer's authentication data, and the grid representation is used to query the approximate likelihoods of new samples of data and assess risk on a contextual basis relative to prior probabilities for a given subject FIG. 1 illustrates an example system for efficient grid-estimation of spherical geo-probability function, according to some embodiments of the present disclosure. The components of system 100 may include any suitable combination of hardware, firmware, and software. System 100 of FIG. 1 includes a network 110, server 120, and database 130.

Network 110 of system 100 is any type of network that facilitates communication between components of system 100. Network 110 may connect one or more components of system 100. This disclosure contemplates any suitable network. For example, one or more portions of network 110 may include an ad-hoc network, an intranet, an extranet, a VPN, a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Server 120 represents any suitable device that is capable of serving and/or receiving content using any internetworking protocol to any number of devices on computer network 110. Server 120 may include web servers, database servers, email servers, web proxy servers, Domain Name System (DNS) servers, File Transfer Protocol (FTP) servers, file servers, virtual servers, application servers, and Dynamic Host Configuration Protocol (DHCP) servers. In some embodiments, server 120 may represent the cloud-based resources of network 110. Servers 120 may include one or more network interfaces, at least one processor 122, and memory 124 that is interconnected by a system bus 128 as well as a power supply. Server 120 may include, in various embodiments, any number of suitable servers or other cloud-based resources. In certain embodiments, server 120 may be a cloud-based provider such as Amazon Elastic Map Reduce® (Amazon EMR®).

Processor 122 represents any suitable hardware for executing instructions, such as those making up a computer program or the various modules contained on memory 124. As an example and not by way of limitation, to execute instructions, processor 122 may retrieve (or fetch) the instructions from an internal register, an internal cache, memory 124, or storage 126; decode and execute them; and then write one or more results to an internal register, an internal cache, memory 124, or storage 126. In particular embodiments, processor 122 may include one or more internal caches for data, instructions, or addresses. This disclosure contemplates processor 122 including any suitable number of any suitable internal caches, where appropriate. As an example and not by way of limitation, processor 122 may include one or more instruction caches, one or more data caches, and one or more translation lookaside buffers (TLBs). Instructions in the instruction caches may be copies of instructions in memory 124 or storage 126, and the instruction caches may speed up retrieval of those instructions by processor 122. Data in the data caches may be copies of data in memory 124 or storage 126 for instructions executing at processor 122 to operate on; the results of previous instructions executed at processor 122 for access by subsequent instructions executing at processor 122 or for writing to memory 124 or storage 126; or other suitable data. The data caches may speed up read or write operations by processor 122. The TLBs may speed up virtual-address translation for processor 122. In particular embodiments, processor 122 may include one or more internal registers for data, instructions, or addresses. This disclosure contemplates processor 122 including any suitable number of any suitable internal registers, where appropriate. Where appropriate, processor 122 may include one or more arithmetic logic units (ALUs); be a multi-core processor; or include one or more processors 122. Although this disclosure describes and illustrates a particular processor, this disclosure contemplates any suitable processor.

Memory 124 includes main memory for storing instructions for processor 122 to execute or data on which processor 122 operates. As an example and not by way of limitation, computer system 100 may load instructions from storage 126 or another source (such as, for example, another computer system 100) to memory 124. Processor 122 may then load the instructions from memory 124 to an internal register or internal cache. To execute the instructions, processor 122 may retrieve the instructions from the internal register or internal cache and decode them. During or after execution of the instructions, processor 122 may write one or more results (which may be intermediate or final results) to the internal register or internal cache. Processor 122 may then write one or more of those results to memory 124. In particular embodiments, processor 122 executes only instructions in one or more internal registers or internal caches or in memory 124 (as opposed to storage 126 or elsewhere) and operates only on data in one or more internal registers or internal caches or in memory 124 (as opposed to storage 126 or elsewhere). One or more memory buses (which may each include an address bus and a data bus) may couple processor 122 to memory 124. Bus 128 may include one or more memory buses, as described below. In particular embodiments, one or more memory management units (MMUs) reside between processor 122 and memory 124 and facilitate access to memory 124 requested by processor 122. In particular embodiments, memory 124 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 124 may include one or more memories 124, where appropriate. Although this disclosure describes and illustrates particular memory, this disclosure contemplates any suitable memory.

Database 130 represents any suitable device or software that is capable of storing customer authentication data. In certain embodiments, database 130 may include standard database software such as MySQL, SQL Server, Oracle Database, Sybase, Postgres SQL, MongoDB, and Informix. In some embodiments, database 130 may include an open-source storage layer such as Databricks Delta Lake®. In certain embodiments, database 130 may be separate from storage 126 and server 120. In certain embodiments, database 130 may include a hard disk drive (HDD), a floppy disk drive, flash memory, an optical disc, a magneto-optical disc, magnetic tape, or Universal Serial Bus (USB) drive or a combination of two or more of these. Database 130 may include removable or non-removable (or fixed) media, where appropriate. Database 130 may be internal or external to computer system 100, where appropriate. In particular embodiments, database 130 is non-volatile, solid-state memory. In particular embodiments, database 130 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Although this disclosure describes and illustrates particular database, this disclosure contemplates any suitable database. In certain embodiments, database 130 includes training data 140 and geo-grid 150.

Training data 140 represents any suitable data structure capable of being stored in database 130 that can represent one or more training points 145. Training data 140 may include arrays, linked lists, or any other suitable data structure. Training data 140 includes one or more training points 145. Training points 145 represents any suitable data structure for storing the authentication data of a given user. In certain embodiments, training points 145 includes certain authentication data such as a unique identifier, latitude value, and longitude value. For example, the unique identifier may be an akey that identifies the end user or a customer that the training point 145 represents. As another example, the latitude and longitude values may represent the location of the given user when they have authenticated themselves at a given time, such as through Cisco Duo®. Training point 145 may include more or less information than shown in FIG. 1. Although this disclosure describes and illustrates particular training data, this disclosure contemplates any suitable training data.

Geo-grid 150 represents any suitable data structure capable of being stored in database 130 that can represent one or more grid points 155. Geo-grid 150 may include arrays, linked lists, or any other suitable data structure. Geo-grid 150 includes one or more grid points 155. Grid points 155 represent any suitable data structure for storing the probability value of a given grid point in the geo-grid. In certain embodiments, grid point 155 includes certain data such as akey, latitude value, longitude value, probability value, and training date. For example, akey identifies the end user that the grid point 155 represents. As another example, the latitude and longitude values may represent the location of the grid point 155. In certain embodiments, of 22 the probability value represents the value that a given grid point is calculated to have after the system has summed all of the grid points together. Grid point 155 may include more or less information then shown in FIG. 1. Although this disclosure describes and illustrates particular geo-grid and grid points, this disclosure contemplates any suitable geo-grid and grid-points.

In an exemplary embodiment of operation, the system begins by triggering the one or more servers 120 (such as Amazon EMR®) to query the one or more databases 130 (such as Databricks Delta Lake®) for the last thirty (30) days of training data 140 per user. In some embodiments, the system triggers the one or more servers 120 weekly to query the training data 140. The training data 140 includes one or more training points 145 that each include a latitude value and longitude value.

In certain embodiments, the system then begins its first training operation. In the first training operation, the one or more servers 120 perform an operation for each training point 145 in the training data 140. For each training point 145 in the training data 140, the one or more servers 120 generate an independent grid of X by Y grid points 155. In some embodiments, the grid is a 50×50 set of grid points 155 in which each grid point 155 is 0.25 latitude and longitude away from its respective neighboring grid point 155. In some embodiments, the N-th training point 145 is the center of the N-th grid of grid points 155. The system then executes a PDF (such as Von-Mises Fisher) to calculate the probability value for each grid point 155 in the grid. In some embodiments, the PDF is calculated using the training point 145 and then evaluated on the nearest neighboring grid points 155.

In certain embodiments, the system then begins its second training operation. The system combines the grids into a geo-grid 150. In certain embodiments, where the latitude and the longitude values are the same for multiple grid points 155 in different grids, the system sums each of the grid points 155 with the same latitude value and longitude value together for a grid point 155 in the geo-grid 150. In certain embodiments, the system then normalizes each grid point 155 in the geo-grid 150 to a value between 0 and 1. In some embodiments, the system also filters the near zero and zero value grid points 155 in the geo-grid 150.

Once the two training operations are complete, the system then proceeds to store the grid points 155 of the geo-grid into the one or more databases 130. In some embodiments, the grid points 155 that the system stores include a unique identifier for the customer (shown as an akey in the illustrated embodiment), a latitude value, a longitude value, a score value, and the training date.

In some embodiments, once the training data 140 has been trained, the system may query the one or more databases 130 for the score value using a unique identifier for the customer, a latitude value, and a longitude value. In some embodiments, the system may query the one or more databases 130 for the score value using batches of unique identifiers, latitude values, and longitude values.

Modifications, additions, or omissions may be made to system 100 without departing from the scope of the disclosure. Although system 100 of FIG. 1 describes and illustrates particular servers 120 and database 130 performing particular actions, this disclosure contemplates any suitable element of FIG. 1 or combination thereof performing any suitable action. For example, server 120 may perform one or more actions described above for system 100. As another example, database 130 may perform one or more actions described above for system 100. Although FIG. 1 illustrates a particular number of networks 110 and server 120 and database 130, this disclosure contemplates any suitable number of networks 110 and servers 120 and databases 130. Although FIG. 1 illustrates a particular arrangement of network 110, server 120, and database 130, this disclosure contemplates any suitable arrangement of network 110.

Figure 2:
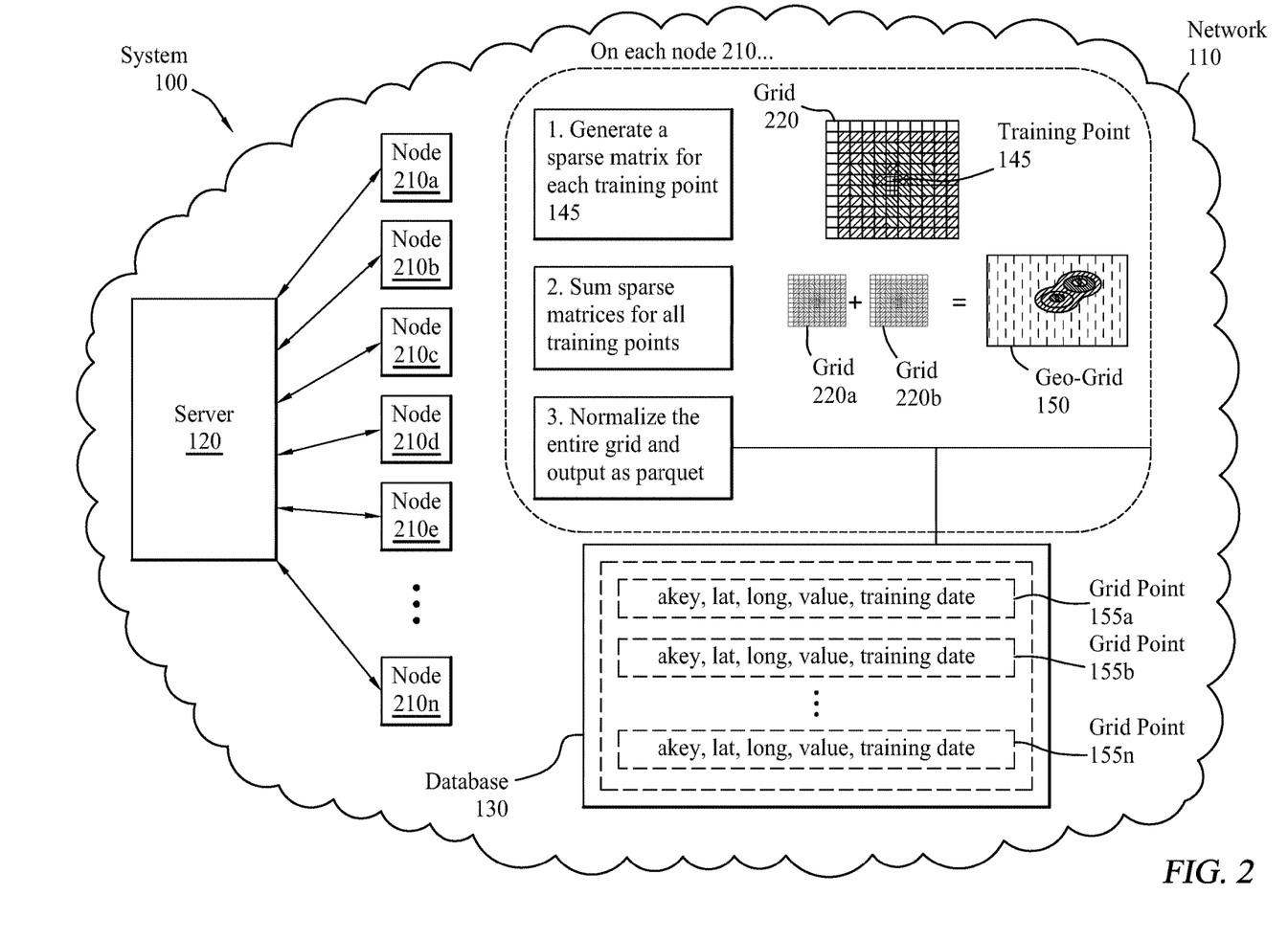
FIG. 2 illustrates the system of FIG. 1 in greater detail, according to some embodiments of the present disclosure.

FIG. 2 illustrates the system of FIG. 1 in greater detail, according to some embodiments of the present disclosure. In the illustrated embodiment, system 100 includes network 110. In the illustrated embodiment, network 110 includes nodes 210a-210n. Further according to the illustrated embodiment, nodes 210 are communicatively coupled to server 120 and to database 130. As shown in FIG. 2, each node 210 includes one or more grids 220, geo grid 150. As also shown in FIG. 2, database 130 includes grid points 155.

Node 210 represents any suitable network device that can receive, create, store and/or send data along a path of network 110. Nodes 210 may include one or more endpoints and/or one or more redistribution points that recognize, process, and forward data to other nodes 210. Nodes 210 may include virtual and/or physical network nodes. In certain embodiments, one or more nodes 210 include one or more virtual machines, hardware devices, bare metal servers, data communications equipment such as computers, routers, servers, printers, workstations, switches, bridges, modems, hubs, and the like. In some embodiments, one or more nodes 210 include data terminal equipment such as routers, servers, printers, workstations, and the like. In certain embodiments, server 120 includes one or more nodes 210. In certain embodiments, each node 210 is a server 120.

Grid 220 represents any suitable data structure for storing one or more grid points 155. Grid 220 may include an array, linked list, or any other suitable data structure for storing grid points 155. In some embodiments, system 100 generates grid 220 for each training point 145 in the training data 140. According to some embodiments, the one or more servers 120 generate an independent grid 220 of X by Y grid points 155 around training point 145. In some embodiments, the grid 220 is a 50×50 set of grid points 155 in which each grid point 155 is 0.25 latitude and longitude away from its respective neighboring grid points 155.

In an exemplary embodiment of operation, the one or more servers 120 of FIG. 1 partitions the training data 140 by a unique identifier (labeled as an "akey" in the illustrated embodiment) to be run on separate nodes 210. In some embodiments, once the training data 140 has been partitioned to be run on the separate nodes 210, each node generates a grid 220 for each training point 145 in the training data 140. Once the grid 220 has been generated for each training point, the one or more servers 120 sum together the grids 220 into one geo-grid. For example, in the illustrated embodiment, system 100 sums grid 220a and grid 220b in order to form geo-grid 150. In order to sum grid 220a with grid 220b, in certain embodiments the system may add each grid point 155 in grid 220a to each grid point 155 in grid 220b where the latitude and longitude values of the grid points are equivalent. Then the one or more servers 120 normalize the entire geo-grid 150. For example, the one or more servers 120 may normalize the geo-grid 150 by normalizing the value for each grid point in the geo-grid-150 between a value of zero and one. In some embodiments, the geo-grid 150 is output in a columnar-storage file format such as Apache Parquet®. In some embodiments, the geo-grid 150 is then stored in the one or more databases 130 of the system.

Modifications, additions, or omissions may be made to system 100 without departing from the scope of the disclosure. For example, in some embodiments, training data 140 may not be partitioned by unique identifier. As another example, in some embodiments, server 120 performs the operations of nodes 210 and they are not needed. In some embodiments, grids 220a and grids 220b are not summed in order to form geo-grid 150. Instead, in some embodiments, grids 220a and grids 220b are multiplied together in order to form geo-grid 150. Although FIG. 2, illustrates that the elements of network 110 are arranged in a particular way, the elements of network 110 may be arranged in any particular way.

Figure 3:
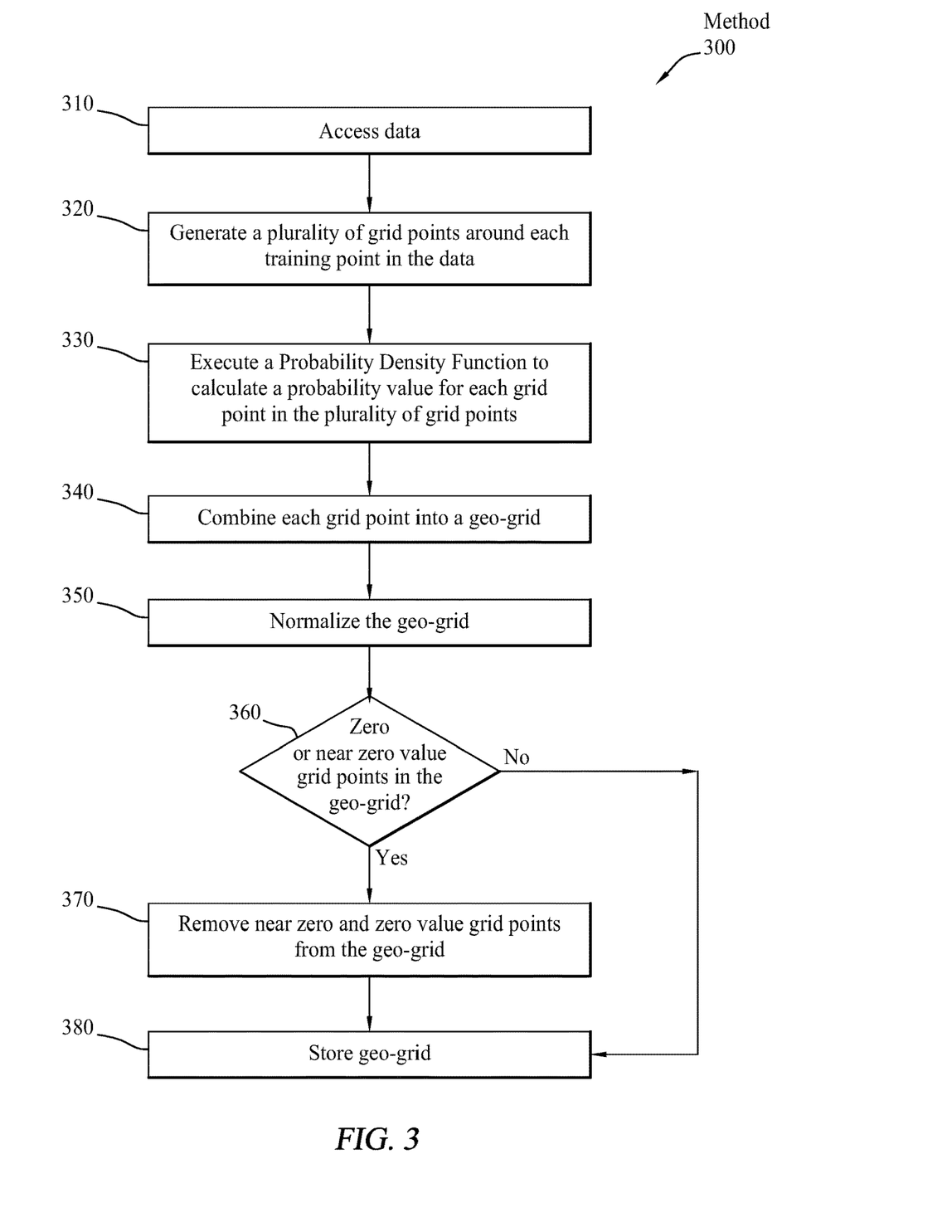
FIG. 3 illustrates an example method for efficient grid-estimation of spherical geo-probability function, according to some embodiments of the present disclosure.

FIG. 3 illustrates an example method for efficient grid-estimation of spherical geo-probability function, according to some embodiments of the present disclosure.

At step 310, method 300 begins. At step 310, system 100 accesses data. In some embodiments, the system begins by triggering the one or more servers 120 (such as Amazon EMR®) to query the one or more databases 130 (such as Databricks Delta Lake®) for the last thirty (30) days of training data 140 per user. In some embodiments, the system triggers the one or more servers 120 weekly to query the training data 140. The training data 140 includes one or more training points 145 that each include a latitude value and longitude value.

At step 320, method 300 generates a plurality of grid points around each training point in the data. In the first training operation, the one or more servers 120 perform an operation for each training point 145 in the training data 140. For each training point 145 in the training data 140, the one or more servers 120 generate an independent grid of X by Y grid points 155. In some embodiments, the grid is a 50×50 set of grid points 155 in which each grid point 155 is 0.25 latitude and longitude away from its respective neighboring grid point 155. In some embodiments, the N-th training point 145 is the center of the N-th grid of grid points 155.

At step 330, method 300 executes a probability density function to calculate a probability value for each grid point in the plurality of grid points. In certain embodiments, the method executes a PDF (such as Von-Mises Fisher) to calculate the probability value for each grid point 155 the grid. In some embodiments, the PDF is calculated using the training point 145 and then evaluated on the nearest neighboring grid points 155.

At step 340, method 300 combines each grid point into a geo-grid. The method combines the grids into a geo-grid 150. In certain embodiments, where the latitude and the longitude are the same for multiple grid points 155 in different grids, the method sums each of the grid points 155 with the same latitude value and longitude value together for a grid point 155 in the geo-grid 150. For example, method 300 sums grid 220a and grid 220b to form geo-grid 150. In order to sum grid 220a with grid 220b, in certain embodiments, the system may add each grid point 155 in grid 220a to each grid point 155 in grid 220b where the latitude and longitude values of the grid points are equivalent.

At step 350, method 300 normalizes the geo-grid. For example, the one or more servers 120 may normalize the geo-grid 150 by normalizing the value for each grid point in the geo-grid-150 between a value of zero and one. Method 300 may use any suitable normalization algorithm and may include linear scaling normalization, clipping normalization, log scaling normalization, z-score normalization, and any other suitable normalization algorithm.

At step 360, method 300 determines for each grid point in the geo-grid, whether the grid point has a zero or near zero value. If the grid point is a zero or near zero value, then method 300 proceeds to step 370. If the grid point is not a zero or near zero value, then method 300 proceeds to step 380.

At step 370, method 300 removes the grid points that have a zero or near zero value. In some embodiments, method 300 removes the grid points 155 that have a zero or near zero value by completely removing them from the data structure that represents the grid points 155 in geo-grid 150. In some embodiments, method 300 removes the grid points 155 that have a zero or near zero value by setting an additional value in the data structure that represents the grid point 155 to ignore the grid point 155 that has a zero or near zero value.

At step 380, method 300 may end by storing the geo-grid. In some embodiments, the geo-grid 150 is then stored in the one or more databases 130 of the system. For example, the geo-grid 150 is output in a columnar-storage file format such as Apache Parquet that is then stored in the one or more databases 130 of the system. In some embodiments, method 300 may then proceed to additional steps according to the present disclosure.

Various embodiments may perform some, all, or none of the steps described above. For example, certain embodiments may omit step 350 under certain conditions because in certain embodiments omitting the step of normalizing the data may be more efficient than normalizing the data. Furthermore, certain embodiments may perform these steps in a different order or in parallel. Moreover, one or more steps may be repeated. For example, steps 310-370 may be repeated for any number of training sessions. While discussed as server 120 performing the steps of this method, any suitable component of system 100 may perform one or more steps of the method.

Figure 4:
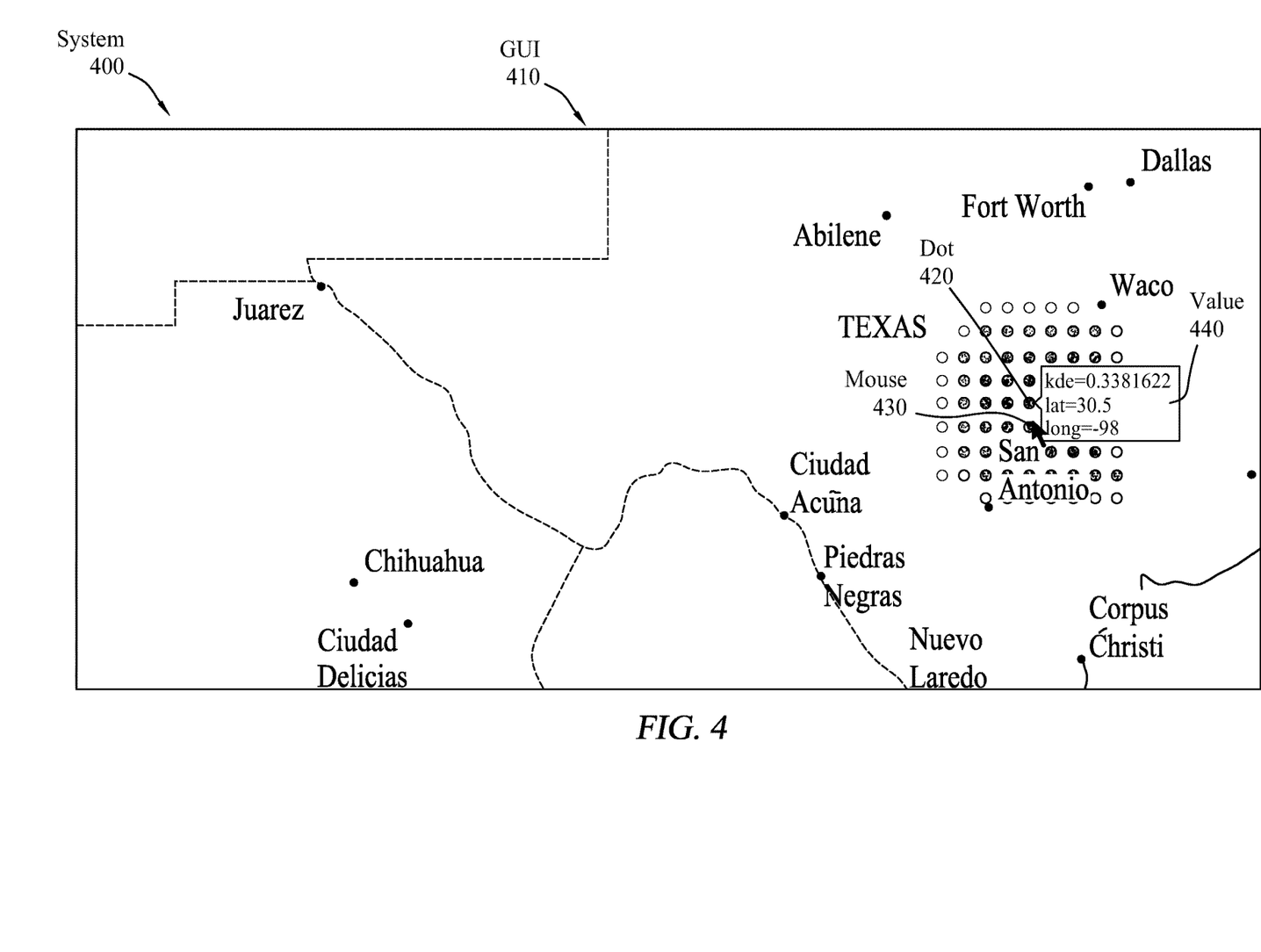
FIG. 4 represents an example graphical grid representation of the approximate probability density function for a customer's authentication data, according to some embodiments of the present disclosure.

FIG. 4 illustrates an example graphical grid representation of the approximate probability density function for a customer's authentication data, according to some embodiments of the present disclosure. In the illustrated embodiment, system 400 includes a graphical user interface (GUI) 410, a dot 420, a mouse 430, and a value 440.

GUI 410 represents any suitable graphical user interface that displays a geographical map and allows a user of system 400 to select a plurality of dots 420 that have been overlayed on top of the map using a mouse 430 in order to display a value 440. GUI 410 may include any suitable software for generating a GUI and may be written in any suitable programming language. In certain embodiments, the GUI 410 may depict visuals or graphics generated by other tools (e.g., Python, Python libraries, or other suitable data analytics applications). GUI 410 also includes a mouse 430. Mouse 430 represents any suitable graphical user interface tool that a user can use to interact with GUI 410. In the illustrated embodiment, mouse 430 hovers over the map displayed on GUI 410 and over a dot 420.

Dot 420 represents any suitable graphical representation that can be overlayed on GUI 410 and may correspond to a grid point in the geo-grid. In the illustrated embodiment, dot 420 is a graphical representation of a circle and is overlayed on top of a map displayed on GUI 410. Dot 420 may include latitude and longitude values that are equivalent to the latitude and longitude values of the grid point 155 that the dot 420 represents in GUI 410. Accordingly, in some embodiments, a dot 420 may appear on a map displayed on GUI 410 according to its latitude and longitude values. In some embodiments, the size of dot 420 may depend on the value of the grid point 155 in geo-grid 150 that it represents. For example, the higher the value of the grid point 155 in geo-grid 150 that a dot 420 represents, the larger the circle of dot 420 will appear. In some embodiments and as shown in the illustrated embodiment, the opacity of dot 420 may depend on the value of the grid point 155 in geo-grid 150 that it represents. For example, the higher the value of the grid point 155 in geo-grid 150 that a dot 420 represents, the higher the percentage of opacity dot 420 will appear.

Value 440 represents any suitable graphical representation that can be overlayed on GUI 410 and can display information about a dot 420. According to the illustrated embodiment, value 440 is shown as a rectangular box with three values shown: the kde probability value of a grid point 155 that is represented by a dot 420; a latitude value of a grid point 155 that is represented by a dot 420; and a longitude value of a grid point 155 that is represented by a dot 420. In some embodiments, value 440 may be displayed on GUI 410 when mouse 430 clicks on a dot 420. In some embodiments, value 440 may be displayed on GUI 410 when mouse 430 hovers over a dot 420.

According to an exemplary embodiment of operation, once the systems and methods as disclosed above have finished training the authentication data, GUI 410 is generated, which allows an end user to quickly and efficiently query for the approximate probability value of a given grid point 155 in a geo-grid 150. In the illustrated embodiment, GUI 410 displays a map. As shown in the illustrated embodiment, the map may include various cities or points of interests. Overlayed on the map are a plurality of dots 420. According to some embodiments, a user interacting with GUI 410 may drag a mouse 430 over one or more of the dots 420 in the plurality of dots. Once the user navigates mouse 430 over a dot 420 for which it desires to obtain the probability value, the user may click or hover the mouse 430 over the dot 420 to obtain the value 440 for the dot 420. Value 440 is then displayed to the user.

Figure 5:
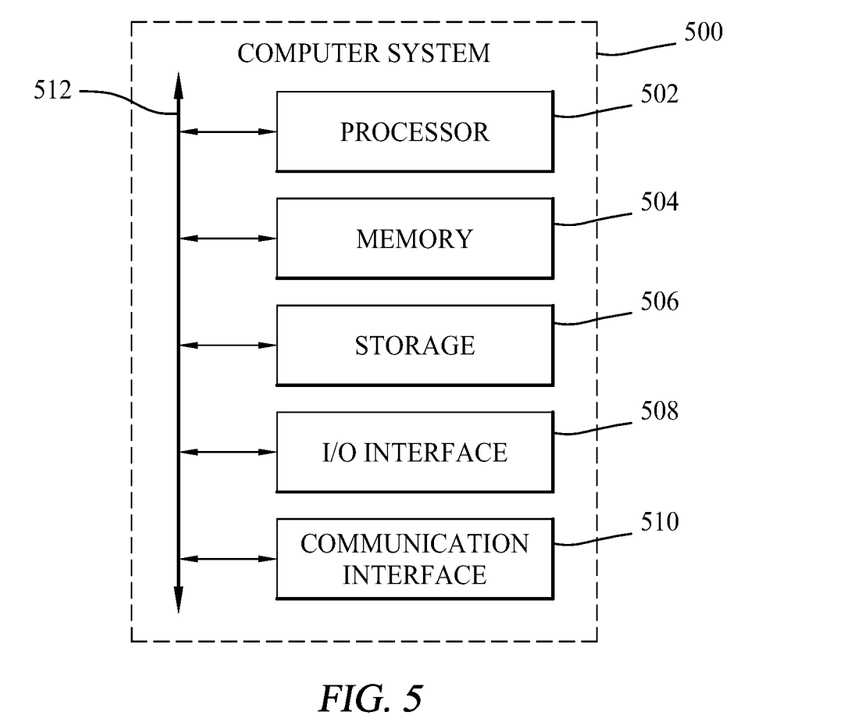
FIG. 5 illustrates an example computer system that may be used by the systems and methods described herein.

FIG. 5 illustrates an example computer system 500. In particular embodiments, one or more computer system 500 perform one or more steps of one or more methods described or illustrated herein. In particular embodiments, one or more computer system 500 provide functionality described or illustrated herein. In particular embodiments, software running on one or more computer system 500 performs one or more steps of one or more methods described or illustrated herein or provides functionality described or illustrated herein. Particular embodiments include one or more portions of one or more computer system 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer system 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
   one or more processors; and
   one or more computer-readable non-transitory storage media comprising instructions that, when executed by the one or more processors, cause one or more components of the system to perform operations comprising:
      accessing data stored in a first memory location, wherein the data comprises training points and each training point comprises a latitude value and a longitude value;
      in response to accessing the data, generating, with a processor, a plurality of grid points for each training point and an independent grid for each training point, wherein:
         the independent grids are stored in a second memory location distinct from the first memory location; and
         each independent grid comprises one or more of the plurality of grid points;

calculating a probability value for each grid point in the plurality of grid points using a probability density function;
combining each independent grid into a geo-grid based at least on the calculated probability values for each grid point in the plurality of grid points;
determining a normalized value for each grid point, wherein the normalized value is based at least on the calculated probability values;
updating the geo-grid based at least on the normalized values;
storing the updated geo-grid; and
generating a graphical representation based at least on the updated geo-grid.

2. The system of claim 1, wherein:
combining each independent grid into the geo-grid comprises adding the probability value of a first grid point to the probability value of a second grid point.

3. The system of claim 2, wherein:
the latitude value of the first grid point is equal to the latitude value of the second grid point and the longitude value of the first grid point is equal to the longitude value of the second grid point.

4. The system of claim 1, the operations further comprising:
filtering the plurality of grid points in the geo-grid that have a probability value of zero.

5. The system of claim 1, wherein:
the probability density function is based on a von Mises-Fisher distribution.

6. The system of claim 1, wherein:
the normalized value for each grid point is a value between 0 and 1.

7. The system of claim 1, wherein:
the probability density function is based on a Gaussian distribution.

8. A method, comprising:
accessing data stored in a first memory location, wherein the data comprises training points and each training point comprises a latitude value and a longitude value;
in response to accessing the data, generating, with a processor, a plurality of grid points for each training point and an independent grid for each training point, wherein:
the independent grids are stored in a second memory location distinct from the first memory location; and
each independent grid comprises one or more of the plurality of grid points;
calculating a probability value for each grid point in the plurality of grid points using a probability density function;
combining each independent grid into a geo-grid based at least on the calculated probability values for each grid point in the plurality of grid points;
determining a normalized value for each grid point, wherein the normalized value is based at least on the calculated probability values;
updating the geo-grid based at least on the normalized values;
storing the updated geo-grid; and
generating a graphical representation based at least on the updated geo-grid.

9. The method of claim 8, wherein:
combining each independent grid into the geo-grid comprises adding the probability value of a first grid point to the probability value of a second grid point.

10. The method of claim 9, wherein:
the latitude value of the first grid point is equal to the latitude value of the second grid point and the longitude value of the first grid point is equal to the longitude value of the second grid point.

11. The method of claim 8, further comprising:
filtering the plurality of grid points in the geo-grid that have a probability value of zero.

12. The method of claim 8, wherein:
the probability density function is based on a von Mises-Fisher distribution.

13. The method of claim 8, wherein:
the normalized value for each grid point in the geo-grid is a value between 0 and 1.

14. The method of claim 8, wherein:
the probability density function is based on a Gaussian distribution.

15. One or more computer-readable non-transitory storage media embodying instructions that, when executed by a processor, cause the processor to perform operations comprising:
accessing data stored in a first memory location, wherein the data comprises training points and each training point comprises a latitude value and a longitude value;
in response to accessing the data, generating, with a process, a plurality of grid points for each training point and an independent grid for each training point, wherein:
the independent grids are stored in a second memory location distinct from the first memory location; and
each independent grid comprises one or more of the plurality of grid points;
calculating a probability value for each grid point in the plurality of grid points using a probability density function;
combining each independent grid into a geo-grid based at least on the calculated probability values for each grid point in the plurality of grid points;
determining a normalized value for each grid point, wherein the normalized value is based at least on the calculated probability values;
updating the geo-grid based at least on the normalized values;
storing the updated geo-grid; and
generating a graphical representation based at least on the updated geo-grid.

16. The one or more computer-readable non-transitory storage media of claim 15, wherein:
combining each independent grid into the geo-grid comprises adding the probability value of a first grid point to the probability value of a second grid point.

17. The one or more computer-readable non-transitory storage media of claim 16, wherein:
the latitude value of the first grid point is equal to the latitude value of the second grid point and the longitude value of the first grid point is equal to the longitude value of the second grid point.

18. The one or more computer-readable non-transitory storage media of claim 15, the operations further comprising:
filtering the plurality of grid points in the geo-grid that have a probability value of zero.

19. The one or more computer-readable non-transitory storage media of claim 15, wherein:
the probability density function is based on a von Mises-Fisher distribution.

20. The one or more computer-readable non-transitory storage media of claim 15, wherein:

the normalized value for each grid point in the geo-grid is a value between 0 and 1.

* * * * *